United States Patent [19]

Panzer et al.

[11] 3,894,945

[45] July 15, 1975

[54] PROCESS FOR RAW WATER CLARIFICATION

[75] Inventors: Hans Peter Panzer, Stamford, Conn.; Kenneth Wayne Dixon, Ypsilanti, Mich.

[73] Assignee: American Cyanamid Company, Stamford, Conn.

[22] Filed: Feb. 25, 1974

[21] Appl. No.: 445,401

Related U.S. Application Data

[60] Continuation-in-part of Ser. No. 347,274, April 2, 1973, abandoned, which is a division of Ser. No. 233,622, Feb. 4, 1972, Pat. No. 3,738,945, which is a continuation-in-part of Ser. No. 115,556, Feb. 16, 1971, abandoned.

[52] U.S. Cl. .................................................. 210/54
[51] Int. Cl.² ......................................... C02B 1/20
[58] Field of Search .................... 210/10, 47, 52–54; 260/89.7 N

[56] References Cited
UNITED STATES PATENTS

| 2,173,069 | 9/1939 | Ulrich et al. ......................... 260/247 |
| 2,753,372 | 7/1956 | Lundburg ............................ 260/501 |
| 3,131,144 | 4/1964 | Nagan .................................. 210/54 |
| 3,240,271 | 3/1966 | Fordyce ................................. 260/2 |
| 3,259,570 | 7/1966 | Priesing et al. ....................... 210/53 |
| 3,493,502 | 2/1970 | Coscia ................................. 210/54 |
| 3,567,659 | 3/1971 | Nagy ..................................... 260/2 |

FOREIGN PATENTS OR APPLICATIONS

1,111,144   7/1961   Germany

*Primary Examiner*—Thomas G. Wyse
*Attorney, Agent, or Firm*—William J. Van Loo

[57] ABSTRACT

Raw water is clarified when it is treated with an effective amount of a polyquaternary flocculant obtained from the reaction of an epoxy compound with a major amount of a secondary amine and a minor amount of a polyamine.

7 Claims, No Drawings

PROCESS FOR RAW WATER CLARIFICATION

This a continuation-in-part of our copending application Ser. No. 347,274 filed Apr. 2, 1973 and now abandoned, which, in turn, is a division of our application Ser. No. 233,622 filed Feb. 4, 1972, now U.S. Pat. No. 3,738,945 issued June 12, 1973, which is a continuation-in-part of application Ser. No. 115556, filed Feb. 16, 1971, now abandoned.

This invention relates to an improved process for clarifying raw water. More particularly, this invention relates to such a process wherein the raw water being clarified is subjected to short detention times in removing suspended solids therein.

Flocculation of aqueous dispersions is an important operation. An aqueous dispersion is a system having at least two phases, one of which is a continuous outer aqueous phase and an inner disperse phase of fine suspended particles. In the case of raw water, the individual particles forming the disperse phase may not be distinctly visible but the water has a definite turbidity which affects its clarity. The clarity of the water, in turn affects its attractiveness in various uses, such as for drinking water, for bathing, for industrial influent, and the like. The aqueous dispersions with which the present invention deals have disperse material which has a negative charge; and in the clarification of river water, for example for producing drinking water or industrial water, there is often chlorine present, which creates further problems.

The raw waters with which the present invention deals are natural waters derived from rain, snow, river, deep well, lakes, ponds, reservoirs, and the like. These waters frequently pick up solid particles which remain suspended therein. The particles may arise through flow of the water such as a river or through run off of rain or snow into the water such as a lake. In any case, these suspended particles can affect the clarity of the water and render it undesirable for the intended use.

German Auslegeschrift 1,111,144, July 20, 1961, produces a polyquaternary by reacting dimethylamine with epichlorohydrin. The product is by a cold reaction addition stage in a dilute aqueous medium followed by a staged heating procedure and is described as a treating agent for dyed materials or as a dyeing assistant. No suggestion of use as a flocculant is made. The products are of low molecular weight as reflected in a viscosity when measured on the Gardner-Holdt scale at 25°C. and at 37% solids, by weight, based on the cationic portion of the polyquaternary compound, of 70 centistokes or less. While subsequent evaluation of the products as flocculants by the present inventors has shown some efficiency, the efficiency is considerably less than the polyquaternaries of the present invention and such evaluation was not suggested in the publication cited. The inventors of the German Auslegeschrift apparently were unaware of methods of increasing molecular weight of the polymer and, since the polymers they obtained were satisfactory for the use intended, were content not to go beyond the extent of polymerization actually achieved.

U.S. Pat. No. 2,454,547, Bock et al., Nov. 23, 1948, discloses preparation of polyquaternary compounds by reaction of secondary amines with epichlorohydrin. The compounds obtained are surface active and of such low molecular weight as not to be considered for use as flocculants. The compounds are prepared by use of expensive solvents, which use increases product costs and requires additional processing steps for solvent recovery.

U.S. Pat. No. 3,259,570 discloses a polymer prepared from equimolar quantities of epichlorohydrin and dimethylamine an in addition 13% by weight of tetraethylenepentamine. The polymer preparative method is not described and it can only be presumed to be in accordance with procedures known at the time. Its performance alone in flocculating a digested slude, as shown in the patent Table 3 is very poor, indicating a low solution viscosity.

In accordance with the present invention, there is provided a process for clarifying a raw water which comprises treating said water with an effective amount of a water-dispersible polyquaternary polymer consisting essentially of the reaction product of a lower dialkylamine, a polyfunctional amine, and a difunctional epoxy compound selected from the group consisting of epihalohydrins, diepoxides, precusors of epihalohydrins and diepoxides which under alkaline conditions are readily converted into the corresponding epoxy compounds, and mixtures thereof, said polyquaternary polymer containing repeating units of the structures

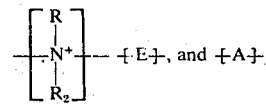

as the cationic portion, and X- as the anionic portion wherein R and $R_2$ are individually selected from the group consisting of alkyls of 1 to 3 carbon atoms; E is a residue obtained from said epoxy compound; A is a residue obtained after at least bifunctional epoxy reaction from a polyfunctional amine selected from the group consisting of ammonia; primary amines; alkylene diamines of 2 to 6 carbon atoms; polyalkylenepolyamines of the structure

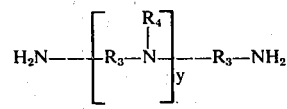

wherein y represents an integer of about 1 to 5, $R_3$ is an alkylene radical of about 2 to 6 carbon atoms, and $R_4$ is selected from the group consisting of hydrogen, alkyl of about 1 to 3 carbon atoms, and ω-aminoalkyl of about 2 to 6 carbon atoms; a polyglycolamine of a structure such as:

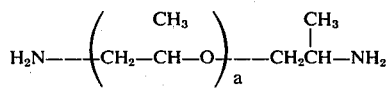

wherein a is an integer of about 1 to 5; piperazine; heteroaromatic diamines of the structure

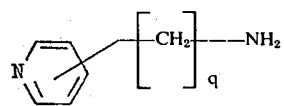

wherein q is zero or an integer of about 1 to 3; and aromatic diamines of the structure

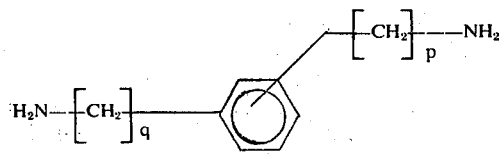

wherein p and q are individually zero or an integer of about 1 to 3; X- is an anion forming the anionic portion of said polyquaternary compound; the amount of said polyfunctional amine being up to about 15 mole percent of the total moles of said dialkylamine and said polyfunctional amine, the amount of said E is from at least that amount which is equimolar to the molar quantities of said amines up to the full functional equivalency of said amines, so as to provide a polyquaternary compound which as a 37% aqueous solution based on the cationic portion of said polyquaternary compound has a viscosity at 25°C. of at least 100 centistokes; and the amount of said ion present is such as to satisfy anion requirements of the cationic portion of said polyquaternary compound, and thereafter recovering the clarified water.

The products of the present invention are superior flocculants to those of the prior art, providing much faster rates of flocculation in treating many waters. This is a particular advantage when short detention times are available for sedimentation of flocs formed in the water upon treatment. Generally, the available detention time of the treated water is limited and a quick-acting flocculant is desirable to provide settling of the flocs. By "detention time" is meant the time period during which flocculation can occur.

The polyquaternary compounds of the present invention, being the result of a polymerization reaction, are not obtained as simple single substances. Instead the products are obtained as a mixture varying in molecular weight as to individual species. Complicating characterization of the polymeric materials is the fact that ionic polyquaternary compounds are involved and characterization is influenced by the anionic portions present. To avoid these various problems, viscosity of aqueous solutions of the polyquaternary compounds is determined at concentrations expressed in terms exclusive of the anionic portion thereof to characterize the polymers and this property is known to correlate well with molecular weight of polymers. Throughout the specification and claims therefore, the viscosity measurement reported is measured at 25°C. in aqueous medium at 37% polymer solids, by weight, based on the total weight of the cationic portion of the polyquaternary compound, that is to say the polymeric material minus its associated anion.

In preparing the various products used in the present invention, epoxy type reactants are employed. Epihalohydrins are used and are intended to include epichlorohydrin and epibromohydrin, for example. Longer chain epihalohydrins may also be used. Epichlorohydrin is preferred both from economic and reactivity aspects. Diepoxides, such as 1,4-butanediol-diglycidyl ether, a preferred diepohide, are also useful. It is to be noted that epihalohydrins and diepoxides are bifunctional in reaction and this permits formation of essentially linear polymers in appropriate instances. Precursors for epihalohydrins and diepoxides are also useful. For example 1,3-dichloropropanol-2, a precursor for epichlorohydrin may be used. Similarly, 1,4-dichloro-2,3-dihydroxybutane, the precursor for 1,3-butanediepoxide, may also be used. These precursors are readily converted into corresponding epoxy compounds under alkaline conditions in the preferred preparative processes. Mixtures of the various epoxy type reactants may also be employed. In forming the principal polymer chain, it is generally preferable to use an amount of epoxy type reactant that is substantially equimolar to the total amount of amine usage, viz, the dimethylamine and the polyamine employed. Although it is not required to use equimolar amounts of epoxy type compound, the polyamine will tend to act as a chain terminator and low molecular weight polymers will result. However, as will be clear hereinbelow, low molecular weight principal chains can be extended by subsequent additions of epoxy type compound. Controlled addition of reactants in forming the reaction mixture can also be employed as a means of influencing formation of the principal polymer chain. In preferred instances, subsequent to reaction of equimolar amounts of total amine and epoxy type reactants, additional increments of epoxy type reactant are added to react with unreacted functionalities of the polyamines, providing acceptable branching and additional quaternarization, as well as crossing-linking of separate molecular chains. Additional reaction with epoxy type compound of unreacted amine functionalities also tends to diminish susceptibility present in specific utilities. In this respect, therefore, it is to be understood that usage of epoxy type compound can be up to the full equivalency of the amine reactants present.

Secondary amines useful in the preparative process include dimethylamine, preferred, diethylamine, dipropylamines and secondary amines containing mixtures of alkyl groups having 1 to 3 carbon atoms. Secondary amines of higher carbon atom contents are generally sluggish in reaction due to steric effects of the substituents present therein. Thus, such amines not only require unduly long reaction times but may also interfere with quaternary formation. Mixtures of the amines recited above may also be employed. It is to be noted that secondary amines are bifunctional in reaction with the bifunctional epoxy type reactants, a first function provided by the hydrogen atom and a second function involving quaternarization of the nitrogen atom.

Polyamines should constitute at least about 1% but not more than 15% of the total molar amounts of amines in the reaction and more usually about 2 to 8% of the molar amount. Higher amounts lead to excessive chain branching and can adversely affect performance and solubility of the products. The specific content of polyamine that may be used will vary in individual instances depending primarily upon the total functionality of the polyamine considered. Thus, polyamines of very high functionality can generally only be used in smaller amounts while polyamines of low functionality can be used in greater amounts, within the general range specified. For example, a diamine having a functionality of 6 or more with respect to the epoxy type reactant cannot be used in amount greater than 8% on a molar basis based on the total molar amount of amines employed, whereas with a functionality of the polyamine less than 6, the amount thereof is greater than 8 mol percent of the total amine. The upper limit of usage of a polyamine is that amount which still provides a water-soluble product. Referring to ethylenediamine, for example, it should be noted that this amine is hexafunctional with respect to reaction with epoxy type compound, four functionalities provided by the two hydrogen atoms present on each amine group and two additional functionalities involving quaternarization of each of the two nitrogen atoms. Not all of these functionalities are of equal reactivity and, consequently, possibilities for control of the reaction to some extent between chain formation, chain branching, and quaternarization are provided. Amounts of polyamine below about 1 mole percent based on the total molar amount of amines employed generally do not have any significant effect on the properties of the polyquaternary compound and it is generally preferred to have at least 2 mole percent present, same basis.

Ammonia is polyfunctional in its reaction with an epoxy type reactant and may be employed as an equivalent to a polyamine. Primary amines are also useful and include a wide variety of aliphatic and aromatic species. The only requirements as to use of primary amine are that it possess sufficient reactivity with the epoxy type compound to exhibit polyfunctional reaction and that its use not result in water-insolubility of the polyquaternary. Preferred primary amines are lower alkyl amines wherein the alkyl groups contain up to about 3 carbon atoms.

Polyamines which may be employed include alkylenediamines of about 2 to about 6 carbon atoms such as ethylenediamine, propylenediamine, and hexamethylenediamine. Oligomers of alkylene diamines are obtained from still bottoms resulting from the purification of certain alkylenediamines for other industrial purposes, for example in the purification of hexamethylenediamine used extensively for producing various nylons. The still bottoms, although not readily characterized as to exact composition give excellent results in preferred embodiments of the present invention and, since they are by-products, are quite economical. Polyalkylenepolyamines are also useful in the present process and include such compounds are diethylenetriamine, dipropylenetriamine, triethylenetetramine, pentaethylenehexamine, nitrilotris(propylamine), propylenediamine, N-methyl, N-propylamine, nitrilotris(ethylamine) and generally any compound of the following structure:

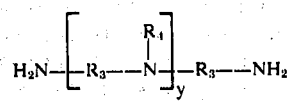

wherein $y$ represents an integer of about 1 to 5, $R_3$ is an alkylene group of about 2 to 6 carbon atoms, and $R_4$ is selected from the group consisting of hydrogen, alkyl of about 1 to 3 carbon atoms, and ω-aminoalkyls of about 2 to 6 carbon atoms. In addition, other useful polyamines include polyglycolamines of a structure such as:

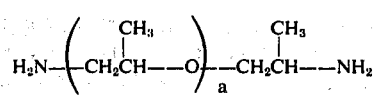

wherein $a$ is an integer of about 1 to 5, heterocyclic aliphatic diamines such as piperazine, heteroaromatic diamines, of the structure:

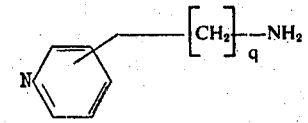

where $q$ is zero or an integer of about 1 to 3 and aromatic diamines of the structure:

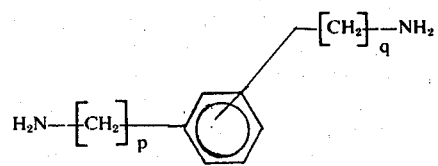

wherein $p$ and $q$ are individually 0 or an integer of about 1 to 3.

Polyamine-polybasic acid condensation products are obtained by condensing a polyfunctional amine with a polyfunctional acid using a slight excess of amine so as to provide an amine-terminated product. Such condensates are widely known, as are their preparative methods. Typically, one would condense an amine such as triethylenetetramine with an acid such as adipic acid using a slight excess of amine over an equimolar charge of reactants. The product obtained has the structure:

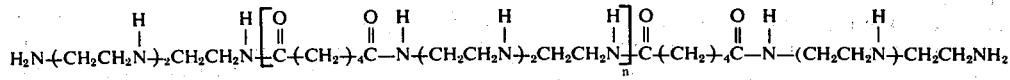

wherein $n$ is an integer such as to indicate a polymer of a molecular weight up to about 10,000. Although the polymer contains amide linkages, it is terminated with amine groups and has additional amine functionality depending upon the number of amine groups in the polyamine employed. Although the condensation product is typified by triethylenetetramine and adipic acid, it is to be understood that other polyamines and polybasic acids, as is well known, may be employed in preparing the condensate.

In carrying out the reaction of epoxy type compounds solely with secondary amine in forming the polymer backbone addition of the reactants may be in either order, i.e. the epoxy type compound may be added to the amine or the amine may be added to the epoxy type compound. Water is essential in preparing the reaction mixture and the amount of water present is critical. Generally, the amount of water present will be in the range of about 10% to about 55%, by weight, based on the total weight of reactants and water, and this is true in connection with a reaction mixture in which the plural amines, i.e., the secondary amine and the polyamine are present in forming the polymer backbone. Absence of water presents problems in controlling the reaction and some water is necessary to effect reaction. The amount of water present also influences the degree of polymerization effected, as reflected in solution viscosity of the resulting polyquaternary compound, lower amounts of water resulting in polyquaternary compounds of higher solution viscosities at equal solids of the cationic portion of the polyquaternary compound. Thus, the ultimate degree of polymerization obtained in a given preparation will be influenced by the amount of water present in the reaction mixture, and for products of high solution viscosities in water at 37% solids, by weight, based on the total weight of the cationic portion of the polyquaternary, it is essential that the amount of water present in the reaction mixture be limited, as indicated, to avoid premature termination of the growing polymer chain by cyclization and hydrolysis occasioned by excessive water usage. In preferred instances, the amount of water present will be in the range of about 15% to 45% water, by weight, based on the total weight of reactants and water. In addition to water as the reaction medium, there may be used a water soluble alcohol in place of part of the water contemplated. It is generally preferred to use water alone, however, from an economic view-point. Another factor in considering the reaction is the quantity and type of polyamine. As the functionality of the polyamine increases, the amount to be used thereof is decreased in order to avoid untoward gelation and to obtain the desired high molecular weight polymer.

The reaction of an epoxy type compound with secondary amine, such as dimethylamine is exothermic, for example, the reaction of epichlorohydrin with dimethylamine is exothermic to the extent of about 40 kilocalories per mole of epichlorohydrin initially. Accordingly, some care should be exercised to control the temperature during preparation of the reaction mixture. Use of water, as described above, is helpful. In addition, the rate of addition of reactants should be such as to keep the temperature in the range of about 20°C. to about 70°C. when the two reactants specified are employed alone. The addition may be of secondary amine to epoxy type compound dispersed or dissolved in water, of secondary amine dissolved in water to epoxy type compound, of epoxy type compound to secondary amine dissolved in water, or any other suitable ramification of the additions recited.

After the desired backbone has been obtained, additional reaction should be allowed to proceed at a suitable temperature until a polyquaternary compound is obtained which, as a 37% aqueous solution by weight, based on the total solids of the cationic portion of the polyquaternary compound, has a viscosity of at least 100 centistokes. In general, higher temperatures permit somewhat more rapid reaction, but the reaction of secondary amine and an epoxy type compound is quite rapid at about 50°C. and so temperatures from about 40°C. to 70°C. constitute a preferred practical range. High viscosities, i.e., in excess of 200 centistokes, under the same conditions of measurement, are possible since polyquaternary compounds are water soluble even at very high viscosities.

There are, in general, two preferred variants employed in use of the two amine types in the reaction. In a first preferred variant, the secondary amine and epoxy type reactant are first reacted to a substantial degree, i.e., from about 50% to about 80% of the reaction potential, in aqueous medium. In forming the reaction mixture, reactants may be added in either order and the temperature is maintained in the range of about 20°–100°C., preferably 20°–70°C. After the desired degree of reaction has been obtained, the polyamine is added and the reaction maintained in the range of about 50°–100°C. until a polyquaternary compound is obtained which as a 37% aqueous solution, by weight, based on the weight of the cationic portion of the polyquaternary compound, has a viscosity of 25°C. of at least 100 centistokes, preferably at least 200 centistokes. The polyquaternary compound is then recovered, as indicated above.

In a second preferred variant, the secondary amine and polyamine are mixed and reacted with the epoxy type reactant in aqueous medium. Addition of reactants may be in any order and in preparing the reaction mixture, the temperature is maintained in the range of 20°–100°C. After the mixture is formed, it is held at a temperature in the range of 50°–100°C. until a viscosity as in the first variant is obtained and the polyquaternary compound is then recovered.

In either of the two variants just described, the total usage of epoxy type reactant may be added during preparation of the reaction mixture. A preferred procedure, however, is to add an amount of epoxy type reactant which is about equimolar to the total amount of amines employed in preparing the reaction mixture and subsequently adding the additional epoxy type reactant in increments up to the level of usage contemplated. In this method of addition, each increment of epoxy type reactant is allowed to react prior to addition of further increments. This method of addition allows very high viscosities to be achieved in a relatively safe manner.

While the range of viscosities, and hence molecular weights, of compounds of the present invention are quite broad, nevertheless they are all of suitable molecular weight. For best performance efficiencies viscosities of 200 centistokes and more are highly desirable as will be seen in the curve of the drawing. There is essentially no significant upper limit on molecular weight except that the polyquaternaries must be water dispersible and preferably water soluble to an extent useful in applications without unduly high viscosity. Products having viscosities as high as 800 or 17,000 centistokes can be used.

The amount of a particular polymer which is to be used depends on the nature of the aqueous dispersion in which the clarification of water containing suspended colloidal clays. For raw water clarification, usage may be from a few parts per million or less to several hundred parts per million or more, depending upon the amount of suspended solids to be flocculated. The present process, as indicated generally involves short detention times, i.e. 30 minutes or less, and the usage of flocculant should be sufficient to obtain effective flocculation within the detention time available.

As can be readily appreciated, the nature of suspended solids in raw waters will vary widely depending upon their point of origin, the course of their travel, the co-mingling of other raw waters therewith, the discharge of treated wastes therein, and the like. The uses to be made of the raw waters may also vary i.e. some may be intended for use as drinking water, others primarily for bathing, and still others for industrial purposes. The varying uses, to some extent, imply a difference in content of the raw water, and consequently tends to imply that the degrees of clarification desired may vary as well as the difficulties involved in clarification. Accordingly, it is not possible to specify the range of usage of polyquaternary flocculant with any degree of particularity because of the numerous variable mentioned. Thus, the polyquaternary flocculant should be used in effective amount, which is readily determined in use.

The invention is more fully illustrated by the examples which follow wherein all parts and percentages are by weight unless otherwise specifically designated. Also, viscosities are of aqueous solutions at 25°C. containing 37% by weight, based on the cationic portion of the polyquaternary flocculant. Viscosity is determined in accordance with the Gardner-Holtz method.

POLYQUATERNARY PREPARATION

Into a 100-gallon glass-lined reactor with a variable speed agitatior and a reflux condenser are introduced 197 pounds of water. The charge port is then closed and the agitator turned on, the reflux condenser also being supplied with cooling water. Then 239 pounds of epichlorohydrin are introduced using an additional 30 pounds of water to flush epichlorohydrin in the lines into the reactor. Separately, 290 pounds of 42% aqueous dimethylamine and 8.1 pounds of ethylenediamine are mixed. A total of 284 pounds of the mixed amines are added gradually to the reactor at an initial rate of about one pound per minute. The addition takes 6 hours. The feed rate is controlled so that the reaction temperature is in the range of 30° to 35°C.

After all the amine is added, the temperature is raised to 50°C. and maintained for 2 hours. Then the reactor is heated to 90°C. with atmospheric steam, using tempered water as the top temperature is reached. When the temperature reaches 80°C., 15.4 pounds of 50% aqueous sodium hydroxide is introduced. After thorough mixing, about 5 minutes, periodic sampling is carried out to determine viscosity. To increase the viscosity 7.7 pounds of epichlorohydrin is added, followed by an additional 7.7 pounds after 40 minutes, 6.2 pounds after 65 minutes, 6.2 pounds after 125 minutes, 6 pounds at 160 minutes, and 5 pounds at 195 minutes. After the viscosity is stable, the batch is cooled to 25°-30°C. The viscosity at 37% solids of the cationic portion of the polymer is 100 centistokes.

Following the same procedure, but increasing the increments of epichlorohydrin and reaction time, additional samples of polymer are obtained having higher solution viscosities, as desired.

EXAMPLE 1

This example illustrates the advantages of the process of the present invention in raw water clarification.

Using a standard contact carrier raw water was treated with 50 parts per million of ferric chloride and 0.1 parts per million of an anionic flocculant identified as a copolymer of 70% acrylamide and 30% acrylic acid. The resulting effluent had a turbidity in excess of 10 parts per million expressed in Jackson turbidity units.

Replacing both the ferric chloride and the anionic flocculant by 5 parts per million of a polyquaternary flocculant of 1,000 centistokes, prepared as described above, there was obtained an effluent having a turbidity less than 5 parts per million expressed in Jackson turbidity units.

In this example, the equipment employed is such that the detention time is up to about 30 minutes.

EXAMPLES 2 AND 3

Following the procedure of Example 1, two additional polyquaternary flocculants according to the present invention are employed to treat Mississippi River water having an initial turbidity of 58 Jackson turbidity units. In Example 2, the polymer solution viscosity as specified is 150 centistokes and in Example 3, it is 200 centistoke. At a usage of 10 parts per million of polymer tyrbidity of the raw water is reduced to 7.5JTU in both examples.

EXAMPLES 4 AND 5

The procedure of Examples 2 and 3 is repeated using raw water from Lake Houston having an initial turbidity of 77JTU. The treated water in each example has a residual turbidity of 2.0 JTU.

I claim:

1. A process for clarifying raw water by sedimentation of solids by action of a quick-acting flocculant which process comprises treating said water with an effective amount of a water-dispersible polyquaternary comprising the reaction product of dimethylamine, a polyfunctional amine, and a difunctional epoxy compound selected from the group consisting of epihalohydrins and precursors for epihalohydrins which under alkaline conditions are readily converted into the corresponding epoxy compounds, and mixtures thereof, said polyquaternary polymer containing repeating units of the structures

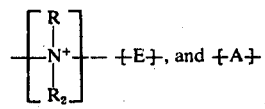

as the cationic portion and $X^-$ as the anionic portion wherein R and $R_2$ are each methyl; E is a residue obtained from said epoxy compound; A is a residue obtained after at least bifunctional epoxy reaction from a polyfunctional amine selected from ethylenediamine and polyethylenepolyamines of the structure

wherein $y$ represents an integer of about 1 to 5; $X^-$ is an anion forming the anionic portion of said polyquaternary compound; the amount of said polyfunctional amine being up to about 15 mole percent of the total moles of said dimethylamine and said polyfunctional amine, the amount of said E being from at least that amount which is equimolar to the molar quantities of said amines up to the full functional equivalency of said amines, so as to provide a polyquaternary compound which as a 37% aqueous solution based on the cationic portion of said polyquaternary compound has a viscosity at 25°C. of at least 100 centistokes; and the amount of said anion present is such as to satisfy anion requirements of the cationic portion of said polyquaternary compound; and thereafter recovering the clarified water.

2. The process of claim 1 wherein the viscosity of said polyquaternary polymer is at least 200 centistokes.

3. The process of claim 1 wherein the viscosity of said polyquaternary is 1,000 centistokes.

4. The process of claim 1 wherein said raw water is a river water.

5. The process of claim 1 wherein said raw water is a lake water.

6. The process of claim 1 wherein the polyfunctional amine is ethylenediamine.

7. The process of claim 1 wherein the epoxy compound is epichlorohydrin.

* * * * *